Patented Apr. 15, 1952

2,592,763

UNITED STATES PATENT OFFICE 2,592,763

CHLORINATED UNCOMPACTED POLYETHYLENE

Robert S. Taylor, Arlington, N. J., assignor to E. I. du Pont de Nemours & Company, Wilmington, Del., a corporation of Delaware No Drawing. Application April 20, 1949, Serial No. 88,693

1 Claim. (Cl. 260—94.9)

This invention relates to the chlorination of solid polymers of ethylene in aqueous suspension. These polymers which are solids at normal temperatures, are disclosed and claimed in Fawcett et al. U. S. Patent 2,153,553.

While various methods of chlorinating ethylene polymers are known in the prior art and even the chlorination in aqueous suspension is mentioned in Myles et al., U. S. Patent 2,398,803, there are some objectionable features in each of the processes heretofore proposed; either the operation of the process tends to be awkward and inefficient or the product obtained tends to be inferior.

An object of the present invention is to provide an improved process of chlorinating solid polymers of ethylene. A more particular object is to provide a practical and efficient process of chlorinating such polymers in aqueous suspension to give a chlorinated polymer of ethylene of superior properties. Other objects will be apparent from the description of the invention given hereinafter.

The above objects are accomplished according to the present invention by suspending in water an uncompacted polymer of ethylene of the character obtainable by ejecting a solid polymer of ethylene formed at elevated temperature and pressure in the presence of water in a reaction vessel, into cooling water at substantially atmospheric pressure, and passing chlorine gas through the suspension formed at a temperature of between 10° C. and 100° C. while maintaining the suspension in a state of agitation and irradiating the suspension with actinic light during the passage of the chlorine therethrough.

It is preferred that the suspension of polymer particles, during chlorination, be at a temperature of 15° C. to 70° C., mechanically agitated, and irradiated with actinic light, specifically light of a wave length range lying between 2800 and 6000 Ångstroms. Further, the chlorination is preferably carried out when employing at least 9 parts of water to 1 part of polymer and 25 to 30 parts or more of water if a chlorinated product having greater than 45% chlorine, by weight, is to be prepared. The presence of a small amount of wetting agent in the water facilitates forming and maintaining the suspension of polymer therein and it has ben discovered that the presence of calcium chloride in the water results in a product of somewhat improved stability, approximately 0.5–2.0 parts of calcium chloride per 100 parts of water being employed.

The preferred product of this invention is a chlorinated solid polymer of ethylene containing 25% to 35% chlorine, by weight, and having a stiffness of 2,000 to 6,000 pounds per square inch, the polymer having an average molecular weight of 18,000 to 20,000 prior to chlorination. The stiffness is given throughout the specification and claims in pounds per square inch measured according to ASTM Method D747 at 25° C. and the average molecular weight as determined by the method disclosed in Fawcett et al. U. S. Patent 2,153,553. Chlorine contents are given by weight throughout.

A feature of the present invention is the discovery of the importance of the physical state of the ethylene polymer to be chlorinated. The polymer should be in uncompacted form of the character obtainable by ejecting the solid polymer formed at elevated temperature and pressure in the presence of water in a reaction vessel, into cooling water at substantially atmospheric pressure. This invention in concerned with the process of chlorinating the polymer, not its preparation, and is, of course, equally applicable to any uncompacted solid polymer of ethylene of this character whether made as above or not. In Peterson U. S. Patent 2,388,178 is disclosed one particular and favorable way of preparing uncompacted ethylene polymer in the general manner above. This comprises feeding ethylene and water in the presence of polymerization-favoring quantities of oxygen and in the presence of an alkali to raise the reaction mixture to a pH above 7, into a reaction vessel at a pressure of 500 to 1500 atmospheres and a temperature of 150° C. to 275° C. Upon substantial completion of the polymerization, the reaction mixture is ejected into cooling water at atmospheric pressure by opening a draw-off valve. The polymerization, however, need not be carried out at a pH above 7 and the pressure and temperature ranges are only to be taken as a general guide. The water vaporizes as it passes through the draw-off valve and thus subjects the polymer to severe expanding forces, leaving it in the form of a spongy solid of low bulk density and porous structure.

The ethylene polymer obtained as above may be used in this invention in pieces of widely varying size. As a matter of convenience, the polymer may be dried and then if necessary, comminuted to the desired particle size although it is not necessary to dry it inasmuch as it is going to be suspended in water for the chlorination step. In any event, the polymer should be screened to remove all agglomerates, i. e., clusters or lumps of numerous individual particles. The uncompacted ethylene polymer with all agglomerates removed and, preferably, all particles of greater size than 10 mesh removed, thereby necessarily removing the agglomerates, is then ready to be dispersed in water and chlorinated. It is preferred the polymer be of particle size between 10-mesh and 200-mesh. All mesh sizes given throughout the specification and claims refer to Standard U. S. Sieve Series.

The following examples in which all parts are given by weight unless otherwise stated, illustrate specific embodiments of the invention. The extent of chlorination of the polymer during the course of the reaction may be accurately estimated by periodic titrations of the acid developed by the reaction in the suspending water. The uncompacted polymer of ethylene used in each example was prepared as described above, and handled in a manner so that its uncompacted form was preserved.

EXAMPLE I

The following materials were mixed in a 20-gallon glass-lined kettle equipped with an agitator, and preheated to 51° C.:

5448 parts of uncompacted solid polymer of ethylene, with particles greater than 40-mesh removed
49200 parts of water
3.0 parts of sodium lauryl sulfate (wetting agent)

With the agitator running, chlorine gas was introduced through the bottom of the kettle at a rate of approximately 3170 parts per hour. The reaction mixture was irradiated by two white, daylight Mazda 15-watt fluorescent bulbs and one 360 BL-Mazda 15-watt fluorescent bulb immersed in the kettle. Chlorination proceeded, as determined by periodic titrations, as follows:

| Time (min.) | Temp. (° C.) | Chlorine Content (Per Cent estimated) |
|---|---|---|
| 0 | 51 | 0 |
| 140 | 48 | 14.5 |
| 250 | 48 | 24.7 |

After 250 minutes the chlorine was turned off, the agitator run for an additional hour, and then the chlorinated polymer was removed and washed. Analysis showed the final chlorine content was 27%.

EXAMPLE II

Chlorination was carried out as in Example I without change except introduction of chlorine was continued for a longer period. Chlorination proceeded, as determined by periodic titrations, as follows:

| Time (min.) | Temp. (° C.) | Chlorine Content (Per Cent estimated) |
|---|---|---|
| 0 | 44 | 0 |
| 180 | 40 | 15.7 |
| 300 | 51 | 25.2 |
| 400 | 29 | 31.3 |

After 400 minutes the chlorine was turned off, the reaction mixture allowed to stand for one hour, and then the chlorinated polymer was separated and washed. The final chlorine content was 36.8%.

EXAMPLE III

Chlorination was carried out as in Example I but using the following substances:

3632 parts of uncompacted solid polymer of ethylene, with particles greater than 40-mesh removed
49200 parts of water
3.0 parts of sodium lauryl sulfate Chlorination proceeded, as determined by periodic titrations, as follows:

| Time (min.) | Temp. (° C.) | Chlorine Content (Per Cent estimated) |
|---|---|---|
| 0 | 50 | 0 |
| 180 | 47 | 24.6 |
| 300 | 50 | 36.2 |
| 400 | 46 | 41.0 |

After 400 minutes the chlorine was turned off, the reaction mixture allowed to stand for one hour, and then the chlorinated polymer was removed and washed. The final chlorine content was 42%.

In the following Table I are given various physical properties of the chlorinated polymers prepared in Examples I, II and III, as compared to the same properties of ethylene polymer which has not been chlorinated.

*Table I*

| Physical Test | Polymer Tested | | | | |
|---|---|---|---|---|---|
| | 0 | 27 (Ex. I) | 36.8 (Ex. II) | 42 (Ex. III) | Per Cent Chlorine |
| Elongation (ASTM Method D 412) at 25° C | 600 | 586 | 246 | 46 | |
| Specific Gravity | 0.92 | 1.091 | 1.188 | 1.244 | |
| Hardness (Durometer D) | 45 | 37 | 51 | 77 | |
| Stiffness p. s. i. (ASTM Method D 747) at 25° C | 13,000 | 2,605 | 8,810 | 131,750 | |
| Flammability in ?/min. (ASTM D 635) | 4.0 | self-extinguishing | self-extinguishing | self-extinguishing | |

EXAMPLE IV

Using the apparatus of Example I, the following charge was introduced into the glass-lined kettle:

1813 parts of uncompacted solid polymer of ethylene, with particles of greater than 40-mesh removed
56775 parts of water
3.0 parts of sodium lauryl sulfate The reaction mixture was maintained between 52° C.–75° C. and agitated throughout with the chlorine being introduced at the rate of approximately 3170 parts per hour. The illumination was provided by two 360 BL-Mazda fluorescent bulbs of 15 watts each and one white, daylight 15-watt Mazda fluorescent bulb immersed in the kettle. The estimated chlorine content after three hours was 39.7% and 58.2% after six hours. The chlorine was turned off at the end of six hours and the resulting chlorinated polymer, after washing, was found to have a chlorine content of 59% and a specific gravity of 1.453.

EXAMPLE V

Using the apparatus of Example I, the following charge was introduced into the glass-lined kettle:

1812 parts of uncompacted solid polymer of ethylene, with particles greater than 40-mesh removed
37850 parts of water
40 parts of calcium chloride
2.0 parts of sodium lauryl sulfate After mixing and preheating the charge to 50° C. chlorine was introduced at about 3170 parts per hour. The reaction mixture was irradiated as in Example I and agitated vigorously throughout the reaction period. After one hour, the chlorine was turned off and the chlorinated polymer separated and washed. It had a chlorine content of 26%.

To compare the stability of the chlorinated polymer of this example with a similar chlorinated polymer (27% chlorine) which was chlorinated under substantially identical conditions except that it was not in the presence of calcium chloride, a sample of each was heated at 180° C. At the end of the first half-hour each sample had lost 2.3 milligrams of hydrogen chloride per gram of sample but during the next half-hour the sample of Example V lost only 0.7 milligram further of chlorine while the other sample lost 0.9 milligram, per gram of sample. On continued heating each sample lost further hydrogen chloride at the same rate. Moreover, a chip molded from the product of this example, after being held in the mold for ten minutes under full steam, was light yellow in color while a chip molded from the other polymer was a definite yellow color after the same treatment.

EXAMPLE VI

The following materials were added to a 48-gallon kettle equipped with an efficient agitator:

13.5 parts of uncompacted solid polymer of ethylene, with particles greater than 20-mesh removed
166.5 parts of water The agitator was started and with the water suspension at room temperature (22° C.) chlorine gas was introduced at the rate of 0.644 part per minute. The reaction mixture was irradiated by three 360 BL-Mazda 15-watt fluorescent bulbs immersed in the kettle. In this run the temperature was not controlled but was allowed to rise due to the heat of the chlorination reaction. During the reaction the rate of chlorine introduction was gradually reduced until after 27 minutes the rate was only 0.373 part per minute. At this point the temperature of the reaction medium was 59° C. The chlorination and agitation were then stopped and the chlorinated polymer removed, washed and dried. The final chlorine content of the polymer was 27% and the stiffness (ASTM D747 at 25° C.) was 2420 pounds per square inch.

It will be understood that the above examples are merely illustrative and that broadly the invention contemplates chlorinating the uncompacted solid polymer of ethylene suspended in water at a temperature of 10° C. to 100° C. in a state of agitation and while being irradiated with actinic light.

No induction has been found in this type of chlorination although there may be a slight lag at the start until the water has been saturated with chlorine. The rate of introduction of the chlorine has no critical bearing on the product obtained though, as a matter of efficient operation, it will usually be introduced at a rate slightly greater than that at which it is absorbed in the reaction mixture, any appreciably slower rate simply unnecessarily prolonging the period required to chlorinate to any given extent while a greater rate involves a waste of chlorine without any attendant advantages. The duration of the chlorinating treatment obviously is determined by the degree of chlorination desired.

The stability of the chlorinated polymer is influenced by the thoroughness with which contaminating substances such as chlorine, metal salts, particularly iron salts, hydrochloric and hypochlorous acids, and the like, are removed and therefore adequate washing of the product is important in obtaining a product of highest quality. To the water used in washing there may be added various anti-acids and anti-chlors well known in the art such as oxalic acid. After the final wash, the chlorinated polymer may be dried in an oven at as low a temperature as practical, usually at 50° C. to 60° C.

Ordinarily the chlorination will be carried out at a temperature between 10° C. and 100° C. and, preferably, between about 15° C. and 70° C., although temperatures above 100° C. may be used where the chlorination is carried out under superatmospheric pressures. It has been found that, if a temperature in excess of 65° C. is used initially, the resin particles may clump together as the chlorine content reaches about 35% to 42% and this clumping together of the particles slows the reaction rate down drastically. Above about 42% chlorine the softening temperature of the polymer rises rapidly while the chlorination rate begins to fall off. Consequently, it is preferred to keep the temperature below 65° C. until the chlorine content of the polymer reaches about 42% so that danger of the particles clumping together is avoided, and then to increase the temperature to 75° C. if further chlorination is desired, as the danger of clumping together has been passed and the increase in temperature is very advantageous in stepping up the rate of chlorination which becomes slower as the chlorine content rises above 42%. For the preferred products, the temperature of the suspension at the start of chlorination should be at 15° C. to 30° C., it being practical to allow the temperature to rise adiabatically, the temperature preferably reaching not in excess of 70° C.

The use of light for irradiating the aqueous suspension during chlorination is essential for the chlorination to proceed at a feasible rate. The desired wave length range is that lying between 2800 and 6000 Ångstroms, the region of strongest absorption spectrum of the chlorine. Light of greater intensity is desirable as the chlorine content of the polymer increases and the effect of the light in increasing the chlorination rate is most marked where the chlorine content is above 50%. As the aqueous suspensions used are practically opaque to light, it is important that light sources be supplied throughout the bulb of the reaction mixture in order to get maximum benefit. By the use of pressures over 100 pounds per square inch, the chlorination of the polymer in water suspension proceeds quite satisfactorily in the absence of light but it usually is far more feasible to work at atmospheric pressure and irradiate the suspension. Initial reaction at atmospheric pressure is exceedingly slow in the dark.

The rate of agitation of the aqueous suspension has a strong influence upon the rate of chlorination and, the more efficient the agitator, the faster has been found the rate of chlorination.

The rate of chlorination is also affected by the concentration of the polymer in aqueous suspension as far as such concentration influences the manner in which the suspension can be agitated. In general, concentrations of the polymer greater than 1 part of polymer to 9 parts of water cannot be handled with efficient agitation to effect chlorination at commercially feasible rates. Therefore, when a chlorine content of less than 45% is desired at least 9 parts of water to 1 part of the polymer is most advantageously used. However, between 40% and 45% chlorine, the polymer swells and the suspension becomes more difficult to agitate so that resins of chlorine content higher than 45% can best be made using suspensions containing one part of polymer to 25 to 30 parts or more of water.

An advantage of the method of the present invention over the prior art methods utilizing solvents lies in the cheapness of the reaction medium, i. e. water. Water suspensions may be handled easily through use of standard, inexpensive and simple equipment. Thus, polymer may be suspended in water, chlorinated, washed, separated, and dried quickly, efficiently and economically. Moreover, the chlorinated product produced by this method is superior to that heretofore produced in the art. The tensile strength of this polymer is almost double that of the polymer made by the solution method of the prior art. The flow temperature of the polymer is higher and stiffness of the polymer produced by this method is greater than that of any made by previous techniques. The polymers exhibiting the most distinct improvement are those which are chlorinated within the range of 25% to 45% and, particularly, from 25% to 35% chlorine. Table II shows the difference in stiffness between chlorinated polymers made according to the present invention and those wherein the polymer in solution is chlorinated.

Table II

| Method of Chlorination | Per Cent Chlorine Content | Stiffness— p. s. i. |
| --- | --- | --- |
| Solution in Carbon Tetrachloride | 33 | 398 |
| Water suspension | 31.2 | 5300 |
| Solution in Carbon Tetrachloride | 44 | 380 |
| Water suspension | 44.2 | 52,600 |

The chlorinated polymers produced by this method may be fabricated into films, sheets, tubes, and filaments for use in various articles such as luggage, raincoats, and food coverings. Although chlorinated solid polymers of ethylene are not new per se, the product produced by this invention, having improved properties, may be more satisfactorily used in many electrical and mechanical adaptations than products heretofore utilized. Thus, the preferred products of this invention are those having a chlorine content of 25% to 35% which are characterized by having a stiffness (ASTM D747 at 25° C.) of 2,000 to 6,000 pounds per square inch. These products are not tacky which make them particularly adaptable to molding, extruding, and otherwise fabricating into articles such as those mentioned, as contrasted with the products having the same chlorine content but made by chlorinating solid polymers of ethylene in carbon tetrachloride solution. The latter products have a much lower stiffness and are somewhat tacky in the range of chlorine content which yields tough flexible polymers, i. e., 25 to 35% chlorine. Furthermore, the products of this invention at approximately 35% chlorine content exhibit a sudden, rather sharp change in stiffness so that above about 35% chlorine content the stiffness of the polymers rises rapidly and these polymers with higher stiffness are not as flexible nor adapted to the above-mentioned applications although, of course, they have other uses, such as in coatings.

These chlorinated polymers of ethylene, because of their superior inflammability and solvent resistance, may readily be used as an impregnant for fabrics to protect them from the deleterious effects of fungi, fire, and water; the polymer is most satisfactorily applied as a solute in volatile chlorinated solvents.

It has also been found that extremely desirable mixtures with other resinous materials may be made. Thus, addition of polymers and copolymers of vinyl chloride, and vinyl acetate to these chlorinated polymers yields a product of high tensile strength; outstanding however, is the material produced by blending synthetic linear polyamides with chlorinated ethylene polymers. The blend is characterized by high tensile strength, increased stiffness, high yield point and flow temperature and improved resistance to liquids normally solvents for some chlorinated polymers of ethylene. These qualities render the mixture ideal for coating, insulating, and similar applications.

This application is a continuation-in-part of applicant's copending application Serial No. 686,149, filed July 25, 1946, and assigned to the assignee of the instant application, and now abandoned.

As many apparently widely different embodiments of this invention may be made without departing from the spirit and scope thereof, it is to be understood that the invention is not limited to the specific embodiments thereof except as defined in the appended claim.

The invention claimed is:

A chlorinated solid polymer of ethylene containing 25% to 35% chlorine and having an ASTM (D747) stiffness in flexure at 25° C. of 2,000 to 6,000 pounds per square inch, said polymer being obtained by chlorination of an uncompacted solid polymer of ethylene having an average molecular weight of 18,000 to 20,000.

ROBERT S. TAYLOR.

REFERENCES CITED

The following references are of record in the file of this patent:

UNITED STATES PATENTS

| Number | Name | Date |
| --- | --- | --- |
| 2,388,178 | Peterson | Oct. 30, 1945 |
| 2,398,803 | Myles | Apr. 23, 1946 |
| 2,422,919 | Myles | June 24, 1947 |